F. L. KEMPFF & H. W. SMITH.
FILM WINDING APPARATUS.
APPLICATION FILED JAN. 21, 1915.
1,144,362.
Patented June 29, 1915.
2 SHEETS—SHEET 1.
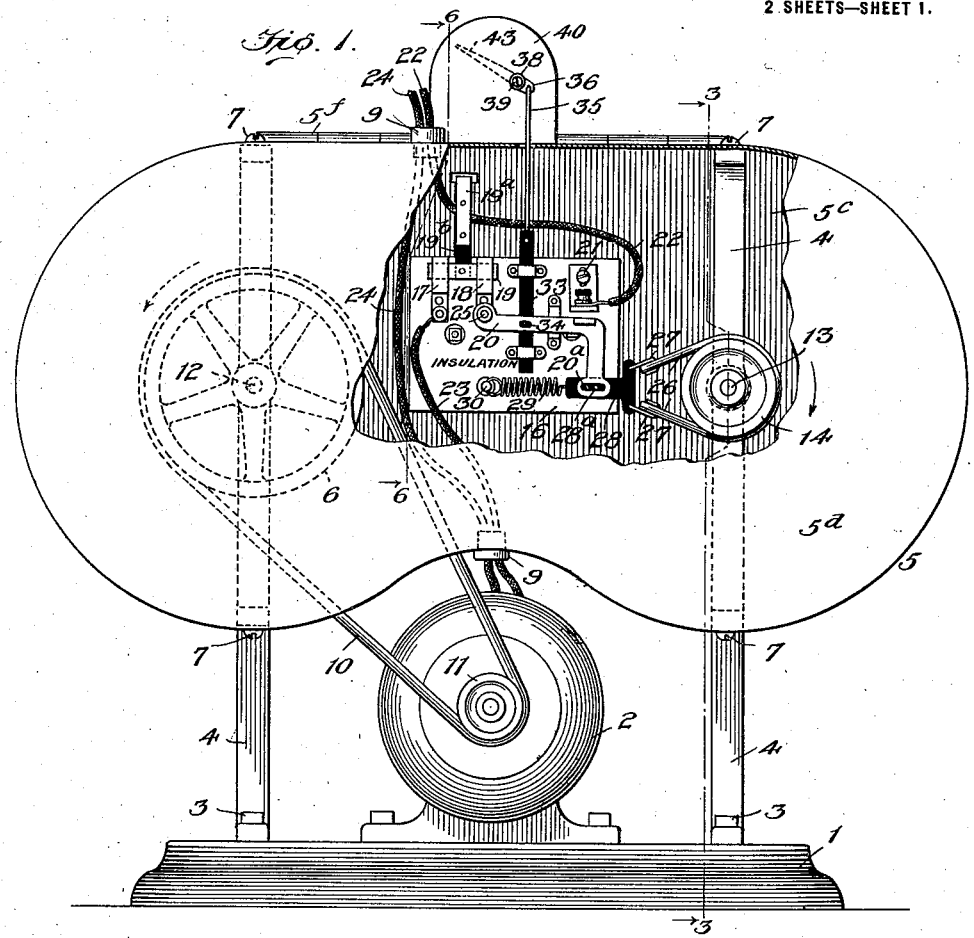
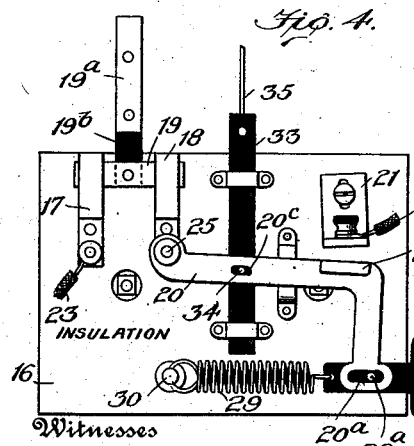
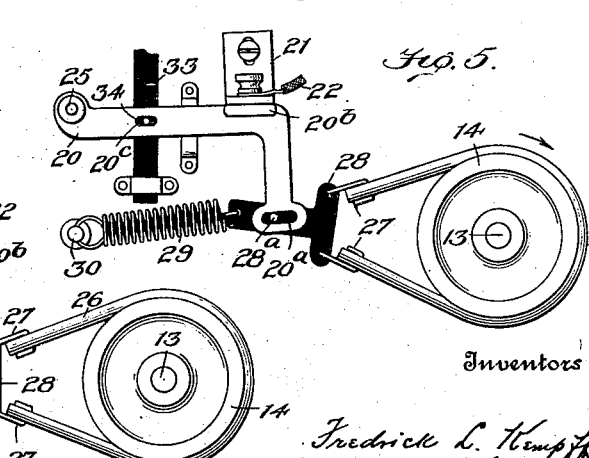
Inventors
Fredrick L. Kempff
Harry W. Smith F. L. KEMPFF & H. W. SMITH.
FILM WINDING APPARATUS.
APPLICATION FILED JAN. 21, 1915.
1,144,362.
Patented June 29, 1915.
2 SHEETS—SHEET 2.
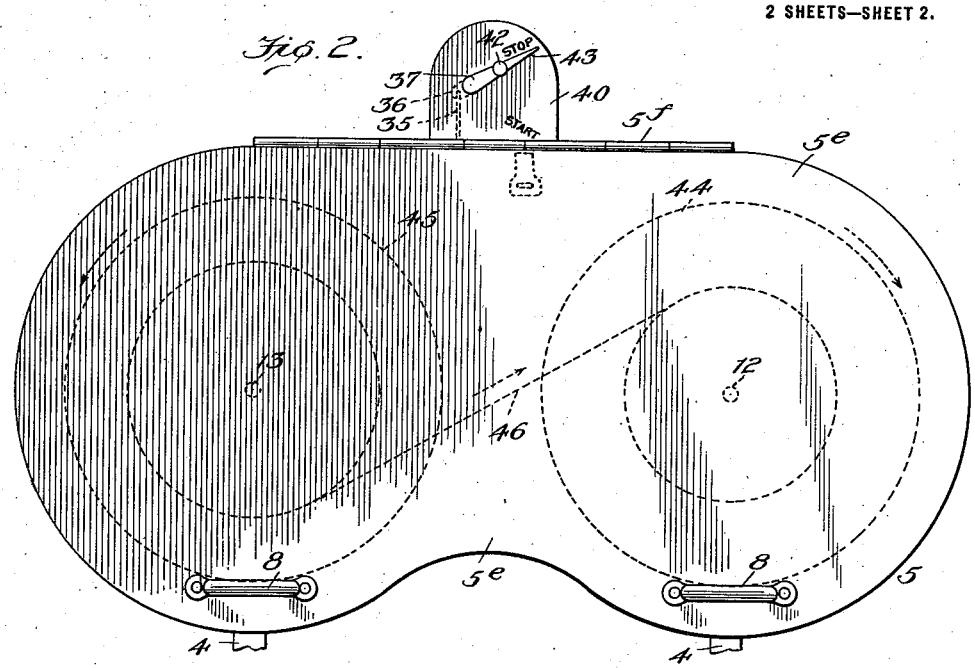
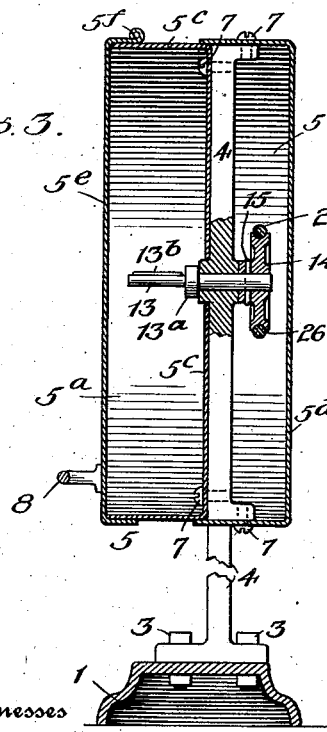
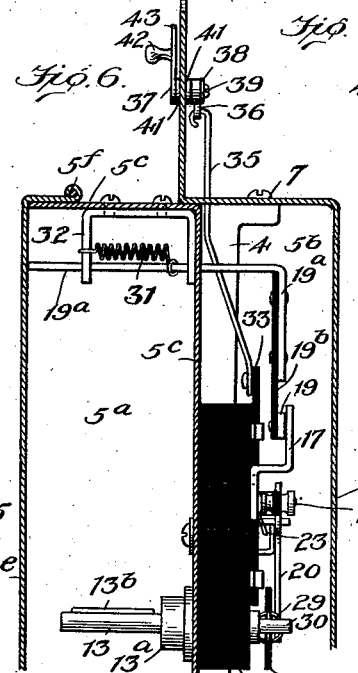
Witnesses
Edwin L Bradford
Wm O Dyre
Inventors
Fredrick L. Kempff
Harry W. Smith
By Ritter & Ritter
Their Attorneys

UNITED STATES PATENT OFFICE.

FREDRICK L. KEMPFF, OF PHILADELPHIA, AND HARRY W. SMITH, OF HARRISBURG, PENNSYLVANIA, ASSIGNORS OF THREE-EIGHTHS TO MYRON W. PICKENS AND THREE-EIGHTHS TO FRANK O. HORTING, BOTH OF HARRISBURG, PENNSYLVANIA, AND ONE-FOURTH TO SAID KEMPFF.

FILM-WINDING APPARATUS.

1,144,362.  Specification of Letters Patent.  Patented June 29, 1915.

Application filed January 21, 1915. Serial No. 3,497.

*To all whom it may concern:*

Be it known that we, FREDRICK L. KEMPFF and HARRY W. SMITH, citizens of the United States, residing at Philadelphia, in the county of Philadelphia and State of Pennsylvania and at Harrisburg, in the county of Dauphin and State of Pennsylvania, respectively, have invented certain new and useful Improvements in Film-Winding Apparatus; and we do hereby declare the following to be a full, clear, and exact description of the invention, such as will enable others skilled in the art to which it appertains to make and use the same.

Our invention relates generally to apparatus for winding films upon reels or the like, but is more particularly designed to afford a simple, durable, efficient and automatically governed means for rewinding exhibited motion picture films so as to put them in condition for subsequent exhibition through the instrumentality of any suitable picture projecting apparatus. As is well understood, after a film has been run through a picture projecting apparatus it is necessary to remove the reel on which the film has been wound and rewind it upon another reel so that the pictures on the film may succeed each other in proper order when again exhibited. As it is usually the case that a film is exhibited a number of times at comparatively short intervals it is desirable that it may be expeditiously rewound or reversed in direction with little expenditure of time on the part of an attendant, since this permits a single person to readily manipulate both the projecting machine and the film winding apparatus without the occurrence of annoying delays between successive exhibitions. It is also desirable that the rewinding apparatus shall serve as a means for testing the exhibited film so that weak places, due to cracks or the like, which might cause the film to break when next passed through the projecting machine may be detected and the film properly repaired before it is again exhibited, thus minimizing the liability of an interruption to the continuous exhibition of the film after it has been started through the projecting machine.

It is, therefore, the principal object of our invention to produce a film winding or reversing apparatus which, after having been started, is automatic in its operation and which also serves as a film testing device of the nature indicated.

Further objects of our invention are to provide an arrangement of parts resulting in a very compact, self-contained apparatus involving few and simple elements; to efficiently protect the film against ignition while being rewound; to effect a perfect and even winding of the film upon the reel; and to cause the stopping of the apparatus whenever the film breaks.

Generally stated, these several objects are accomplished in an apparatus involving the combination of a driving shaft which is adapted to receive and cause the rotation of a reel upon which the film is to be wound, a driven shaft that is adapted to receive a reel from which the film is to be transferred to the driving reel, a pulley mounted upon and rotatable with the driven shaft, a belt or friction brake coöperating with said pulley to offer resistance to the rotation of the driven shaft and thus to subject the film to the desired tension during rewinding, an electric motor for rotating the driving shaft, a circuit breaker connected to said belt for automatically opening the motor circuit when the driven shaft ceases to be driven by the film, a manually operated starting device for actuating the said circuit breaker to bring it into circuit closing position while the driven shaft and pulley carried thereby are stationary, a metallic casing and cover therefor forming a fire-proof compartment or housing into which the reel receiving ends of the said shafts project, and a circuit breaker operated by the cover of said compartment whereby the motor circuit can be closed only when said cover is closed. Such a combination embodies the principal features of our invention, the scope whereof is hereinafter pointed out in the claims.

In the accompanying drawings illustrating the preferred form of our invention, Figure 1 is a rear elevation of a film winding apparatus embodying our invention, a portion of the rear cover being broken away. Fig. 2 is a front elevation of the upper portion of the apparatus. Fig. 3 is a detail vertical section on the line 3—3, Fig. 1, looking in the direction of the arrows, certain portions of the mechanism being omitted. Fig. 4 is a detail view in elevation, showing the devices for opening and closing the motor circuit. Fig. 5 is a detail view showing the position assumed by the automatic circuit breaker device when the apparatus is in operation. Fig. 6 is a detail sectional view on the line 6—6, Fig. 1, looking in the direction of the arrows. Fig. 7 is a detail view, partly in elevation and partly in vertical section, showing a portion of the manually operated starting device.

Similar reference characters indicate corresponding parts throughout the drawings.

The apparatus may be conveniently formed with a suitable metal base 1 upon which is mounted an electric motor 2. It is preferred to secure to the base 1, as for example by means of bolts 3, a pair of upwardly extending standards 4 which carry a housing 5 that is preferably formed with two compartments 5$^a$ and 5$^b$, respectively, the compartment 5$^a$ being designed to receive the reels for the film and the compartment 5$^b$ serving to contain and protect the motor controlling devices and the pulley 6 that is belted to the motor shaft. The housing 5 is designed to be fire-proof and to this end is preferably formed of sheet metal which is pressed into the desired shape. For the sake of compactness it is preferred to concavely curve the lower central portion of the housing, as shown in Figs. 1 and 2, thereby securing ample space for the location of the motor 2 beneath the same without unduly increasing the height of the apparatus.

The housing 5 is preferably made in three sections or parts, 5$^c$, 5$^d$ and 5$^e$, each of which is formed with a marginal flange that is adapted to overlap or telescope with an adjacent section to thereby form a close joint preventing the passage of sparks or flame. As more particularly shown in Fig. 3, the housing members 5$^c$ and 5$^d$, which form the compartments 5$^a$ and 5$^b$, respectively, are preferably removably secured to the standards 4 by means of screws 7, the member 5$^e$ being hinged along its upper edge, as at 5$^f$, to the housing member 5$^c$ to thereby form a cover for the latter and render fire-proof the compartment for the film reels. Handles 8 may be conveniently secured to the cover 5$^e$ for raising the same to gain access to the compartment 5$^a$ of the housing, and it is also preferred to provide the housing with insulators 9 through which the wires of the motor circuit may be led into the compartment 5$^b$.

The pulley 6 is driven from the motor 2 by a belt 10 which passes around a pulley 11 that is secured to the outer end of the motor shaft, the section 5$^d$ of the housing being cut away to afford clearance for the belt. The pulley 11 is preferably smaller than the pulley 6, to the end that the horizontally extending shaft 12 on which the pulley 6 is mounted may not too rapidly revolve the film reel which is also mounted upon and movable with said shaft. The shaft 12 for receiving the reel on which the film is to be wound is preferably identically the same, both in respect to structure and manner of mounting, as the parallel horizontal shaft 13 which receives the reel from which the film is to be wound. As shown more particularly in Fig. 3, this latter shaft is journaled in one of the uprights or standards 4. To prevent lateral movement in one direction, as well as to determine the position of the film reel thereon, the shaft is preferably provided with an integrally attached collar 13$^a$ which bears against one side of the upright 4, while the hub of the pulley 14, which may be conveniently secured to said shaft by a key 15, bears against the opposite face of said upright and thus prevents the shaft from sliding in the opposite direction. In order to cause the film reel and shaft upon which it is mounted to revolve together the latter may be and preferably is provided with a spline 13$^b$ which is adapted to engage the corresponding slot with which film reels are customarily provided.

Within the compartment 5$^b$ of the housing and secured to the vertical wall of the member 5$^c$ thereof is a block 16 of slate or other insulating material. Mounted in spaced relation on this insulating base 16 are a pair of contact members 17 and 18 which, for convenience of manufacture, may be made of similar form and which preferably have their upper ends spaced away from the insulating base 16, as shown in Fig. 6, to thereby afford space for the operation of a circuit breaker 19 which is adapted by the closing of the cover or lid 5$^e$ of the housing to close the circuit between the contact members 17 and 18.

Electrically connected to the contact member 18 is an automatic circuit breaker 20 which, when the shaft 13 is being driven by the film that is being withdrawn from the reel mounted thereon, closes the circuit between said contact member 18 and a contact member 21 which is connected to the source of electric power by means of a wire 22. The circuit through which the motor is supplied with power is completed by a wire 23 leading from the contact member 17 to the motor and by a wire 24 connecting the motor with the source of electric energy. The circuit breaker 20 is preferably formed with two arms extending at an angle to each other, being pivotally connected at one end to the contact member 18, as at 25, and being fashioned at its other end with a slot 20$^a$. As will be noted, the circuit breaker 20 is so arranged that the force of gravity constantly tends to separate its contact face 20ᵇ from the contact member 21. While such an arrangement is desirable, the opening of the circuit by the circuit breaker 20 is preferably positively effected, as will presently appear.

Passing around the pulley 14 is a belt or band 26, preferably of leather, which is attached in spaced relation at its ends, as by means of hooks 27, to a plate 28 that is provided with a laterally projecting pin or stud 28ᵃ which extends through the slot 20ᵃ in the lower end of the circuit breaker 20, the said stud and the points of connection of the brake band 26 to the plate 28 being arranged in the form of a triangle. On the opposite side of the stud 28ᵃ from the points of connection of the plate 28 with the band 26, said plate is connected to one end of a coiled tension spring 29 that is anchored at its other end by means of a stud 30 which is mounted on the insulating base 16. As will be readily appreciated, the tension of the spring 29 acting through the plate 28 and belt or band 26 causes the latter to act as a friction brake upon the pulley 14, and thus, through the shaft 13 and the film reel mounted thereon, to apply a corresponding tension to the film that is being withdrawn from said reel. As will also be readily understood, these devices likewise serve to quickly arrest the rotation of the film reel which is on the shaft 13 should the film break, thus preventing any substantial quantity of it from being freed from the film reel and becoming injured or entangled within the compartment in which the reels operate.

From an inspection of Figs. 4 and 5 of the drawings, the latter of which illustrates the relative positions of the parts when the apparatus is in operation, it will be seen that the friction between the pulley 14 and the band 26, as said pulley rotates within said band in the direction indicated by the arrow in Fig. 5, causes the band 26 to pull upon the plate 28 and turn or rock it. This causes the projecting stud 28ᵃ which extends into the slot 20ᵃ of the circuit breaker 20 to move upwardly and force its contact face 20ᵇ against the contact member 21 to thus close the circuit at this point. As long as the shaft 13 and pulley 14 continue to be driven by the film the circuit breaker maintains its circuit closing position, but as soon as the film ceases to drive the pulley 14 the spring 29 draws the plate 28 to the position illustrated in Fig. 4, by which movement the stud 28ᵃ is caused to draw the circuit breaker away from the contact member 21, thus opening the circuit and automatically stopping the motor. To prevent leakage the plate 28 is preferably made of fiber or other suitable insulating material.

The circuit breaker 19, by which the contacts 17 and 18 are connected when the lid 5ᵉ is closed, has an arm 19ᵃ which extends through an aperture in the partition between the compartments 5ᵃ and 5ᵇ of the housing, a section 19ᵇ of insulating material being interposed between said arm and that portion of the circuit breaker which bridges the space between the contact members 17 and 18. A spring 31, which is attached at one end to the arm 19ᵃ and which is attached at the other end to a stationary guide bracket 32 through the depending portions of which the said arm 19ᵃ extends, serves to draw the circuit breaker 19 away from the contact members 17 and 18 whenever the lid or cover 5ᵉ is opened. When the lid is closed it forces the circuit breaker 19 into contact with the contact members 17 and 18, putting the spring 31 under tension. It will thus be seen that it is impossible to start the motor until the cover of the reel compartment 5ᵃ is closed. Even when the lid 5ᵉ of the housing is closed it is impossible to start the motor 2 until the circuit is closed through the automatic circuit breaker 20. In order, therefore, to start the motor, means are provided for manually actuating the circuit breaker 20 to bring it into engagement with the contact member 21. These means preferably consist of a vertically reciprocating bar of insulating material 33 having a laterally projecting stud 34 which extends into a slot 20ᶜ in the circuit breaker. Connected to and extending upwardly from said bar 33 is a rod or link 35 which is pivotally connected to an arm 36 that is rigidly secured to the squared end of a crank 37 by means, for example, of a suitable washer 38 and screw 39, as shown in Fig. 7. The crank 37 is preferably journaled in a vertically extending plate 40 which may be formed as an integral part of the section 5ᵈ of the housing 5. Washers 41 which encircle the shaft of the crank 37 and are located on opposite sides of the plate 40 furnish an extended bearing for the crank and retain it in proper position. The crank 39 is preferably formed with a knob 42 which the operator may conveniently grasp and it is also preferably provided with an extension forming a pointer or indicator 43 whose position will visually indicate the position of the circuit breaker 20. As shown in Fig. 2, appropriate words may appear on the face of the plate 40 to indicate the positions of the pointer 43 corresponding to the starting and stopping of the motor. When the lid 5ᵉ of the housing is closed and the crank 37 is rotated in the proper direction to pull the rod 35 and bar 33 upwardly, the pin or stud 34 on said bar raises the circuit breaker 20 until its contact face 20ᵇ comes into engagement with the contact member 21. The motor circuit is then completely closed. As soon as the motor 2 is running at its normal speed the operator may release his hold upon the crank 37, since the circuit breaker 20, so long as the pulley 14 continues to be driven by the film, will be automatically maintained in circuit closing position, as previously explained. If for any reason it is desired to stop the operation of the device without lifting the cover 5ᵉ the crank 37 may be rotated in the proper direction to cause a downward movement of the attached rod 35 and bar 33, thus causing the stud 34 carried by the latter to depress the circuit breaker 20 and break its contact with the contact member 21.

The relative position of the film reels and the manner of leading the film from one reel to the other is indicated diagrammatically in dotted lines in Fig. 2, the driving reel being marked 44, the driven reel 45, and the film 46. The directions of motion of these several elements are indicated by arrows.

We claim:

1. In an apparatus of the character indicated, the combination of an electric motor, a driving shaft actuated thereby and which is adapted to be provided with a film receiving reel, a driven shaft also adapted to be provided with a reel for the film, said driven shaft being driven by said driving shaft through the instrumentality of the film, brake mechanism operating on said driven shaft to thereby apply tension to the film passing from one reel to the other, and a circuit breaker adapted to be controlled by the brake mechanism of the driven shaft.

2. In an apparatus of the character indicated, the combination of an electric motor, a driving shaft actuated thereby and which is adapted to be provided with a film receiving reel, a driven shaft also adapted to be provided with a reel for the film, said driven shaft being driven by said driving shaft through the instrumentality of said film, a pulley rigidly mounted on said driven shaft, a brake band passing around said pulley, yielding means for causing said brake band to press against said pulley, and a circuit breaker which is adapted to be automatically opened by the brake mechanism of the driven shaft.

3. In an apparatus of the character indicated, the combination with an electric motor, of a shaft driven thereby which is adapted to be provided with a film receiving reel, a second shaft which is also adapted to be provided with a reel for the film and which is driven from said shaft first named through the instrumentality of the film, a pulley rigidly secured to said film-driven shaft, a circuit breaker in the motor circuit, and means actuated through the rotation of said pulley for maintaining said circuit breaker in circuit closing position.

4. In an apparatus of the character indicated, the combination with an electric motor, of a shaft driven thereby which is adapted to be provided with a film receiving reel, a second shaft which is also adapted to be provided with a reel for the film and which is driven from said shaft first named through the instrumentality of the film, a circuit breaker in the motor circuit, a pulley rigidly secured to said film-driven shaft, a brake band passing around said pulley, and yieldingly supported movable means connected to said brake band and to said circuit breaker.

5. In an apparatus of the character indicated, the combination with an electric motor, of a shaft driven thereby which is adapted to be provided with a film receiving reel, a second shaft which is also adapted to be provided with a reel for the film and which is driven from said shaft first named through the instrumentality of the film, a circuit breaker in the motor circuit, means actuated by said film-driven shaft for automatically actuating said circuit breaker, and means for manually actuating said circuit breaker.

6. In an apparatus of the character indicated, the combination with an electric motor, of a housing having a compartment which is adapted to receive a plurality of film-carrying reels, a plurality of revoluble shafts having portions extending into said compartment and being adapted to carry said reels, one of said shafts being driven by said motor and serving to drive the other shaft through the instrumentality of the film, and said housing having a movable cover for said compartment, a circuit breaker in the motor circuit which is operated by said cover, a second circuit breaker in said circuit, and means actuated through the rotation of said film-driven shaft for moving said last named circuit breaker to circuit closing position.

7. In an apparatus of the character indicated, the combination with a base, of a motor mounted thereon, a housing mounted on said base and extending above said motor, said housing having a plurality of compartments and being recessed on the under side so as to permit the upper portion of said motor to extend into said recess, a plurality of shafts revolubly mounted in said housing and having portions extending into the different compartments, a pulley rigidly mounted on one of said shafts and located in one of said compartments, means for driving said pulley from said motor, a pulley rigidly mounted on the other shaft and located in the same compartment as the other pulley, a circuit breaker in the motor circuit and located within the compartment containing the pulleys, and means actuated through the rotation of one of said pulleys for maintaining said circuit breaker in position to close the motor circuit.

8. In an apparatus of the character indicated, the combination with a plurality of shafts each of which is adapted for the reception of a film reel, of a motor for driving the shaft of the film receiving reel, the shaft of the film delivering reel being adapted to be driven through the instrumentality of the film passing from one reel to the other, brake mechanism operating on the shaft of the film delivering reel for applying tension to the film passing from reel to reel, said brake mechanism being adapted to cause the stopping of the motor when the film breaks.

In testimony whereof we affix our signatures, in the presence of two subscribing witnesses.

FREDRICK L. KEMPFF.
HARRY W. SMITH.

Witnesses:
M. C. MILLER,
A. G. LEADER.